US007844610B2

(12) United States Patent
Hillis et al.

(10) Patent No.: US 7,844,610 B2
(45) Date of Patent: Nov. 30, 2010

(54) DELEGATED AUTHORITY EVALUATION SYSTEM

(75) Inventors: W. Daniel Hillis, Encino, CA (US); Bran Ferren, Beverly Hills, CA (US)

(73) Assignee: Google Inc., Mountain View, CA (US)

( * ) Notice: Subject to any disclaimer, the term of this patent is extended or adjusted under 35 U.S.C. 154(b) by 991 days.

(21) Appl. No.: 10/854,662

(22) Filed: May 25, 2004

(65) Prior Publication Data

US 2005/0131722 A1 Jun. 16, 2005

Related U.S. Application Data

(60) Provisional application No. 60/529,245, filed on Dec. 12, 2003.

(51) Int. Cl.
*G06F 7/00* (2006.01)
*G06F 17/30* (2006.01)

(52) U.S. Cl. ....................................... 707/740; 707/748

(58) Field of Classification Search ................. 707/740, 707/748

See application file for complete search history.

(56) References Cited

U.S. PATENT DOCUMENTS

| | | | |
|---|---|---|---|
| 2,895,005 | A | 7/1959 | Kock et al. |
| 3,116,365 | A | 12/1963 | Prescott |
| 3,992,586 | A | 11/1976 | Jaffe |
| 4,688,443 | A | 8/1987 | Fabre et al. |
| 4,847,784 | A | 7/1989 | Clancey |
| 4,853,873 | A | 8/1989 | Tsuji et al. |

(Continued)

FOREIGN PATENT DOCUMENTS

EP 1182590 2/2002

(Continued)

OTHER PUBLICATIONS

Nelson, C., "Use of Metadata Registries for Searching for Statistical Data," Jul. 24-26, 2002, Dimension EDI Ltd., Proceedings of the 14th International Conference on Scientific and Statistical Database Management, pp. 232-235.

(Continued)

*Primary Examiner*—Robert Timblin
*Assistant Examiner*—Mariela D Reyes
(74) *Attorney, Agent, or Firm*—Michael A. Glenn; Glenn Patent Group

(57) ABSTRACT

The invention provides an evaluation system for reliably evaluating large amounts of content. The evaluation system is managed by a primary authority that designates one or more contributing authorities by delegating to each a specific quantity of authority. Each contributing authority may in turn designate and delegate authority to one or more additional contributing authorities, subject to the restriction that the total quantity of authority delegated does not exceed the quantity of authority the contributing authority was itself delegated. Each contributing authority, and optionally the primary authority itself, may evaluate one or more portions of content by associating a rating with each evaluated portion of content. A composite rating for a particular portion of content may then be determined based upon the ratings associated with the portion of content. Preferably, the ratings are combined in a manner that affords a higher priority to the ratings provided by contributing authorities to which a greater quantity of authority was delegated.

32 Claims, 5 Drawing Sheets

U.S. PATENT DOCUMENTS 4,881,135 A 11/1989 Heilweil
4,992,940 A 2/1991 Dworkin
4,996,642 A * 2/1991 Hey ........................... 705/27
5,073,934 A 12/1991 Matyas et al.
5,117,258 A 5/1992 Iwata
5,133,045 A 7/1992 Gaither et al.
5,212,768 A 5/1993 Itsuki et al.
5,404,295 A 4/1995 Katz et al.
5,404,305 A 4/1995 Stiles, Jr.
5,426,510 A 6/1995 Meredith
5,430,473 A 7/1995 Beecher, II et al.
5,500,671 A 3/1996 Anderson et al.
5,511,122 A 4/1996 Atkinson
5,597,312 A 1/1997 Bloom et al.
5,598,209 A 1/1997 Cortjens et al.
5,612,734 A 3/1997 Nelson et al.
5,678,999 A 10/1997 Cicare
5,701,400 A 12/1997 Amado
H1728 H 5/1998 Kelso et al.
5,751,337 A 5/1998 Allen et al.
5,751,809 A 5/1998 Davis et al.
5,832,474 A 11/1998 Lopresti et al.
5,867,799 A 2/1999 Lang et al.
5,907,619 A 5/1999 Davis
5,940,513 A 8/1999 Aucsmith et al.
5,956,404 A 9/1999 Schneier et al.
5,960,411 A 9/1999 Hartman et al.
5,963,245 A 10/1999 McDonald
5,995,624 A 11/1999 Fielder et al.
6,003,021 A 12/1999 Zadik et al.
6,009,173 A 12/1999 Sumner
6,012,053 A 1/2000 Pant et al.
6,070,149 A 5/2000 Tavor et al.
6,076,091 A 6/2000 Fohn et al.
6,076,163 A 6/2000 Hoffstein et al.
6,098,065 A 8/2000 Skillen et al.
6,125,445 A 9/2000 Arditti et al.
6,131,162 A 10/2000 Yoshiura et al.
6,171,109 B1 1/2001 Ohsuga
6,185,558 B1 2/2001 Bowman et al.
6,202,060 B1 3/2001 Tran
6,202,062 B1 3/2001 Cameron et al.
6,226,742 B1 5/2001 Jakubowski et al.
6,230,269 B1 5/2001 Spies et al.
6,283,757 B1 9/2001 Meghnot et al.
6,292,211 B1 9/2001 Pena
6,311,194 B1 10/2001 Sheth et al.
6,341,960 B1 1/2002 Frasson et al.
6,347,333 B2 2/2002 Eisendrath et al.
6,374,237 B1 4/2002 Reese
6,401,206 B1 6/2002 Khan et al.
6,405,175 B1 6/2002 Ng
6,438,691 B1 8/2002 Mao
6,466,918 B1 10/2002 Spiegel et al.
6,471,586 B1 10/2002 Aiki et al.
6,477,520 B1 11/2002 Malaviya et al.
6,499,105 B1 12/2002 Yoshiura et al.
6,507,357 B2 1/2003 Hillis et al.
6,535,880 B1 3/2003 Musgrove et al.
6,601,075 B1 * 7/2003 Huang et al. ............. 707/104.1
6,633,981 B1 10/2003 Davis
6,691,106 B1 2/2004 Sathyanarayan
6,704,729 B1 3/2004 Klein et al.
6,714,234 B1 3/2004 Hillis et al.
6,732,090 B2 5/2004 Shanahan et al.
6,751,773 B2 6/2004 Nakamura et al.
6,772,157 B2 * 8/2004 Barnett et al. .................. 707/9
6,789,126 B1 9/2004 Saulpaugh et al.
6,799,176 B1 9/2004 Page
6,807,535 B2 10/2004 Goodkovsky
6,827,578 B2 12/2004 Krebs et al.
6,856,968 B2 2/2005 Cooley et al.
6,884,074 B2 4/2005 Theilmann et al.
6,975,833 B2 12/2005 Theilmann et al.
6,980,974 B2 12/2005 Kobayashi et al.
6,988,198 B1 1/2006 Zuccherato et al.
7,000,118 B1 2/2006 Murthy et al.
7,058,628 B1 6/2006 Page
7,065,494 B1 * 6/2006 Evans .......................... 705/10
7,080,064 B2 7/2006 Sundaresan
7,100,051 B1 8/2006 Kipnis et al.
7,107,218 B1 9/2006 Preston
7,143,089 B2 11/2006 Petras et al.
7,165,080 B2 1/2007 Kotcheff et al.
7,181,438 B1 2/2007 Szabo
7,263,529 B2 8/2007 Cordery et al.
7,263,671 B2 8/2007 Hull et al.
7,337,389 B1 2/2008 Woolf et al.
2001/0034837 A1 10/2001 Kausik et al.
2002/0013780 A1 1/2002 Brown et al.
2002/0016840 A1 * 2/2002 Herzog et al. ............... 709/225
2002/0023011 A1 2/2002 Hatayama
2002/0023093 A1 2/2002 Ziff et al.
2002/0026583 A1 2/2002 Harrison et al.
2002/0049692 A1 4/2002 Venkatram
2002/0069079 A1 6/2002 Vega
2002/0072410 A1 6/2002 Tanaka et al.
2002/0073080 A1 6/2002 Lipkin
2002/0091836 A1 7/2002 Moetteli
2002/0095579 A1 7/2002 Yoshiura et al.
2002/0126120 A1 9/2002 Snowdon et al.
2002/0152279 A1 10/2002 Sollenberger et al.
2002/0161603 A1 * 10/2002 Gonzales ....................... 705/1
2003/0033298 A1 2/2003 Sundaresan
2003/0093790 A1 5/2003 Logan et al.
2003/0134675 A1 7/2003 Oberberger
2003/0152893 A1 8/2003 Edgar
2003/0187841 A1 10/2003 Zhang et al.
2003/0188180 A1 10/2003 Overney
2003/0195834 A1 10/2003 Hillis et al.
2004/0001104 A1 1/2004 Sommerer et al.
2004/0003351 A1 1/2004 Sommerer et al.
2004/0059625 A1 3/2004 Schrader
2004/0097852 A1 5/2004 Boyd et al.
2004/0205448 A1 10/2004 Grefenstette et al.
2004/0205514 A1 10/2004 Sommerer et al.
2005/0060283 A1 3/2005 Petras et al.
2005/0107912 A1 5/2005 Martin et al.
2005/0119053 A1 6/2005 Suzuki et al.
2005/0245316 A1 11/2005 Tanaka et al.

FOREIGN PATENT DOCUMENTS

JP 04322649 11/1992
JP 08084328 3/1996
WO WO 00/05666 2/2000
WO WO 00/75840 12/2000
WO WO 01/01313 1/2001

OTHER PUBLICATIONS

Anguish Scott, “Storing your application’s preferences and Support files,” Jan. 14, 1998, Stepwise Server, http:..www.stepwise.com.Articles/Technical/ApplicationStorage.html.
Michael Margolis and David Resnick; Third Voice: Vox Populi Vox Dei?; Oct. 1999; First Monday, vol. 4, No. 10; pp. 1-5; downloaded from: worldwideweb.firstmonday.org/issues/issue4_10/margolis/index.html.
Nagao, et al.; “Semantic Annotation and Transcoding: Making Web Content More Accessible”; Apr.-Jun. 2001; IEEE Multimedia.
Kahan, et al.; “Annotea: An Open RDF Infrastructure for Shared Web Annotations”; May 1-5, 2001; ACM, Hong Kong.

* cited by examiner

DELEGATED AUTHORITY EVALUATION SYSTEM

RELATED APPLICATIONS

This application claims benefit of U.S. provisional patent application Ser. No. 60/529,245 entitled Reputation System, filed Dec. 12, 2003, which is incorporated herein in its entirety by this reference thereto.

BACKGROUND

1. Technical Field

The invention relates to systems for assessing the value of content. More particularly, the invention relates to systems for reliably evaluating large amounts of content in a distributed manner.

2. Description of the Prior Art

Many sites found on the World Wide Web allow users to evaluate content found within the site. For example, the Amazon® web site (www.amazon.com) allows users to submit reviews of books listed for sale, including a zero to five star rating. The Slashdot Web site (www.slashdot.org) allows users to "mod" comments recently posted by other users. Based on this information obtained from the users, the system determines a numerical score for each comment ranging from 1 to 5.

Because such systems do empower a great number of users to evaluate content, the scope and extent of the content that may be evaluated is great. However, because there is no restriction on the users that may participate, the reliability of the ratings is correspondingly diminished. In an effort to address this deficiency, such systems often allow users to evaluate the evaluations themselves. For example, Amazon® allows other users to evaluate the submitted reviews by indicating that they found a review helpful. Slashdot allows users to annotate submitted comments with attributes, such as funny or informative. The large number of submitted comments can then be filtered based on these annotations and the numerical score described above. Nonetheless, each of these approaches essentially relies on a mass consensus in which each contributor to the evaluation process is granted equal significance.

However, evaluation systems that adopt a more centralized, more controlled approach, e.g. commissioning a small number of trusted evaluators or editors, are inevitably overwhelmed by the immensity of the content in need of evaluation. Thus, while the reliability of the evaluations may increase, time constraints ensure that the scope and extent of the content evaluated is diminished.

Thus, there is a need for a new system of evaluating content that obviates this apparent tradeoff. Preferably, the evaluation system should be distributed in nature, ensuring that an extremely large amount of content can be evaluated without unduly burdening any individual evaluator. However, the distribution of the evaluation effort should be performed in a manner that preserves the integrity of the evaluation process. The evaluation system should thus provide evaluations for extensive content in a reliable manner.

SUMMARY

The invention provides an evaluation system for reliably evaluating large amounts of content. The evaluation system is managed by a primary authority that designates one or more contributing authorities by delegating to each a specific quantity of authority. Each contributing authority may in turn designate and delegate authority to one or more additional contributing authorities, subject to the restriction that the total quantity of authority delegated does not exceed the quantity of authority the contributing authority was itself delegated.

Each contributing authority, and optionally the primary authority itself, may evaluate one or more portions of content by associating a rating with each evaluated portion of content. A composite rating for a particular portion of content may then be determined based upon the ratings associated with the portion of content. Preferably, the ratings are combined in a manner that affords a higher priority to the ratings provided by contributing authorities to which a greater quantity of authority was delegated.

Preferably, the quantities of delegated authority and the ratings associated with a portion of content are specified numerically, and the composite rating is determined by a weighted average of the ratings in which the weighting applied to a rating is proportional to the total authority of the authority that provided the rating. Alternatively, the composite rating may be determined using an additive combination of the ratings, a computation of the mode, median, or mean of the ratings, or a count of the ratings. The primary authority, as well as the contributing authorities, may add authorities to the evaluation system by designating and delegating authority to new contributing authorities. Correspondingly, contributing authorities may be removed from the evaluation system through the revocation of authority. By delegating additional authority to, or revoking existing authority from, previously designated contributing authorities, a primary authority or a contributing authority may alter the relative authority of the contributing authorities within the evaluation system.

In this manner, the authority initially instilled within the primary authority is propagated through a distributed network of contributing authorities. Thus, while the potentially large number of designated contributing authorities can effectively evaluate large amounts of content, the delegation of authority ensures that the evaluations remain reliable.

DETAILED DESCRIPTION

The invention provides an evaluation system for reliably evaluating large amounts of content. The evaluation system is managed by a primary authority that designates one or more contributing authorities by delegating to each a specific quantity of authority. Each contributing authority may in turn designate and delegate authority to one or more additional contributing authorities, subject to the restriction that the total quantity of authority delegated does not exceed the quantity of authority the contributing authority was itself delegated.

Each contributing authority, and optionally the primary authority itself, may evaluate one or more portions of content by associating a rating with each evaluated portion of content.

A composite rating for a particular portion of content may then be determined based upon the ratings associated with the portion of content. Preferably, the ratings are combined in a manner that affords a higher priority to the ratings provided by contributing authorities to which a greater quantity of authority was delegated.

In this manner, the authority initially instilled within the primary authority is propagated through a distributed network of contributing authorities. Thus, while the potentially large number of designated contributing authorities can effectively evaluate large amounts of content, the delegation of authority ensures that the evaluations remain reliable.

Figure 1:
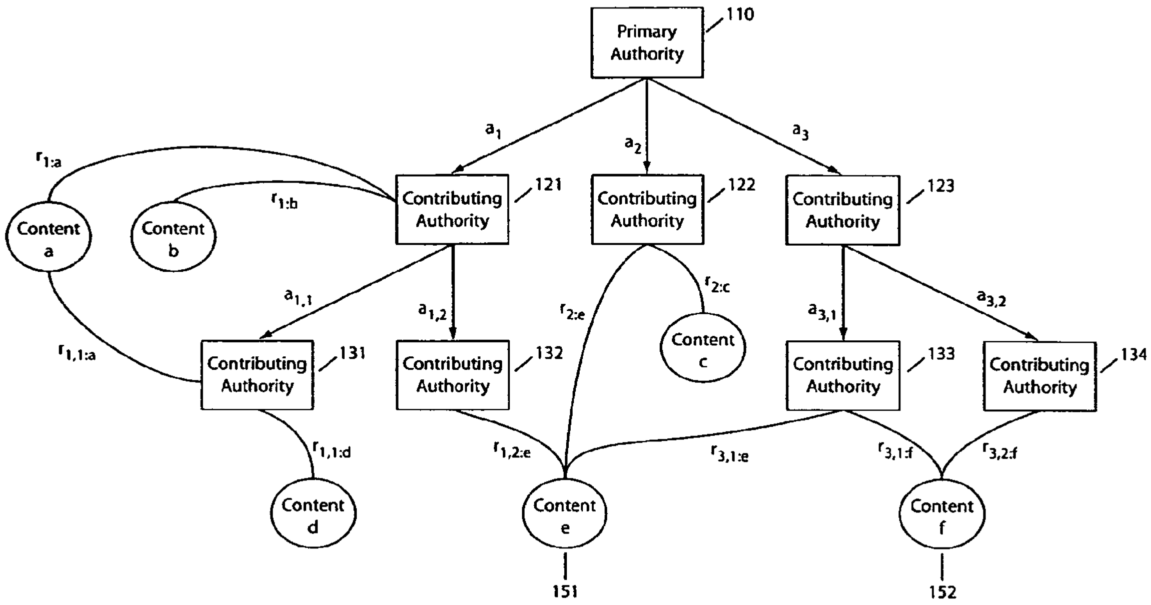
FIG. 1 shows an evaluation system according to a preferred embodiment of the invention.

FIG. 1 shows an evaluation system according to a preferred embodiment of the invention. The reputation system is managed by a primary authority 110. The primary authority has designated several contributing authorities 121, 122, and 123 by delegating to each a specific quantity of authority, namely a1, a2, and a3, respectively. Two of the contributing authorities 121 and 123 have in turn designated additional contributing authorities 131-134, delegating to each quantities of authority $a_{1,1}$, $a_{1,2}$, $a_{3,1}$, and $a_{3,2}$, respectively. In this manner, a chain of authority is established linking the primary authority with each of the contributing authorities within the evaluation system.

As noted previously, the total quantity of authority delegated by each of the contributing authorities is restricted to be less than or equal to the total quantity of authority that the contributing authority was itself delegated. In the example of FIG. 1, it is therefore required that $a_{1,1}+a_{1,2}<=a_1$, and $a_{3,1}+a_{3,2}<=a_3$. Preferably, each contributing authority seeks to maximize its influence within the evaluation system, in which case the total authority delegated by the contributing authority equals the authority it was itself delegated. That is, in the example of FIG. 1, $a_{1,1}+a_{1,2}=a_1$ and $a_{3,1}+a_{3,2}=a_3$.

Preferably, the quantity of authority delegated is represented by a positive number. However, in some embodiments of the invention, the quantity of authority delegated may be negative. In so doing, the designating authority indicates a level of distrust for the designated contributing authority. The quantity of authority delegated may be treated as a negative quantity in determining the total quantity of authority the designated contributing authority may delegate, but treated as a positive quantity in enforcing the restriction on the total quantity of authority that the delegating authority may delegate.

Once authority has been delegated to a contributing authority, it may evaluate portions of content. An authority preferably evaluates many portions of content, and a particular portion of content may be evaluated by more than one authority. The evaluation is performed by associating a rating r with the portion of content. In FIG. 1, a contributing authority 133 has associated a rating $r_{3,1:f}$ with a portion of content 152 and a rating $r_{3,1:e}$ with another portion of content 151, which has also been rated by contributing authorities 122 and 132 with ratings $r_{2:e}$ and $r_{1,2:e}$, respectively.

Preferably, the ratings are numeric in nature, and are constrained to lie between a lower and upper bound that are standardized within the evaluation system. Preferably, the lower and upper bounds are −1 and 1, with −1 indicating a very unfavorable evaluation, and 1 indicating a very favorable evaluation. In other embodiments of the invention, the ratings may range from 0 to 1, with 0 indicating a very unfavorable evaluation. Alternatively, a contributing authority may assign ratings within an arbitrary range of values, with the ratings normalized by the rating with the largest absolute value.

A composite rating for a particular portion of content may be determined based upon the ratings associated with the portion of content. Preferably, the ratings are combined in a manner that affords a higher priority to the ratings provided by contributing authorities to which a greater quantity of authority was delegated. For example the ratings may be combined using a weighted average. For a portion of content given a rating $r_i$ by authority i among N authorities evaluating the portion of content, the composite rating may be defined as $$R=(1/W)\Sigma(w_i r_i),\ i=1,N \quad (1)$$

where $w_i$ is the total authority delegated to authority of i, and $$w=\Sigma(w_i)\ i=1,N \quad (2)$$

For example, for portion of content 151 in FIG. 1, $$R=(a_{1,2}r_{1,2:e}+a_2r_{2:e}+a_{3,1}r_{3,1:e})/(a_{1,2}+a_2+a_{3,1}). \quad (3)$$

Other approaches to determining the composite rating are possible. For example, a mean, median, or mode of the ratings may be computed. These methods are not preferred, though, as they do not respect the manner in which authority was delegated among the evaluating authorities. It is also possible to compute a composite rating that reflects the pervasiveness of a portion of content. Most simply, the number of authorities evaluating the content may be counted, providing a direct indication of how widely the content has been disseminated.

Alternatively, the ratings associated with the content may be added. That is, $$R=\Sigma(r_i)\ i=1,N \quad (4)$$

In this approach, portions of content that have been rated by many authorities generally have a higher composite rating than those that have been evaluated by only a few authorities. This approach to computing the composite rating may also be used to incorporate the age of the content into the composite rating, because a portion of content presumably receives an increasing number of ratings over time.

Figure 2:
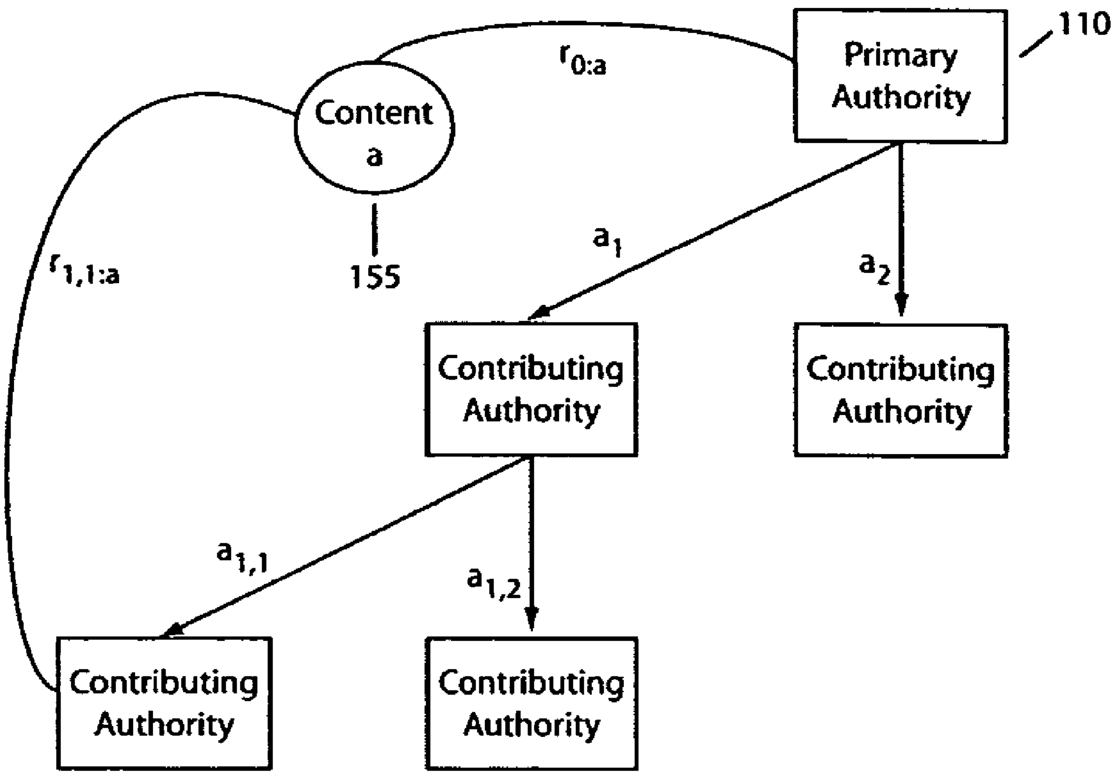
FIG. 2 shows an evaluation system according to a preferred embodiment of the invention in which a primary authority directly evaluates a portion of content.

FIG. 2 shows an evaluation system according to a preferred embodiment of the invention in which a primary authority directly evaluates a portion of content. While it is anticipated that a large number of contributing authorities perform the great majority of evaluations, thereby increasing the amount of content that may be evaluated, the invention does not restrict the primary authority from directly evaluating content itself. To determine the composite rating for a portion of content evaluated directly by the primary authority, the authority associated with the rating given by the primary authority is equal to the sum of all authority delegated by the primary authority. For example, in FIG. 2, the primary authority 110 has evaluated a portion of content 155 by associating with the content a rating $r_{0:a}$. Here, the composite rating is computed as $$R=(a_0r_{0:a}+a_{1,1}r_{1,1:a})/(a+a_{1,1}), \quad (5)$$

where $a_0=a_1+a_2$.

Figure 3:
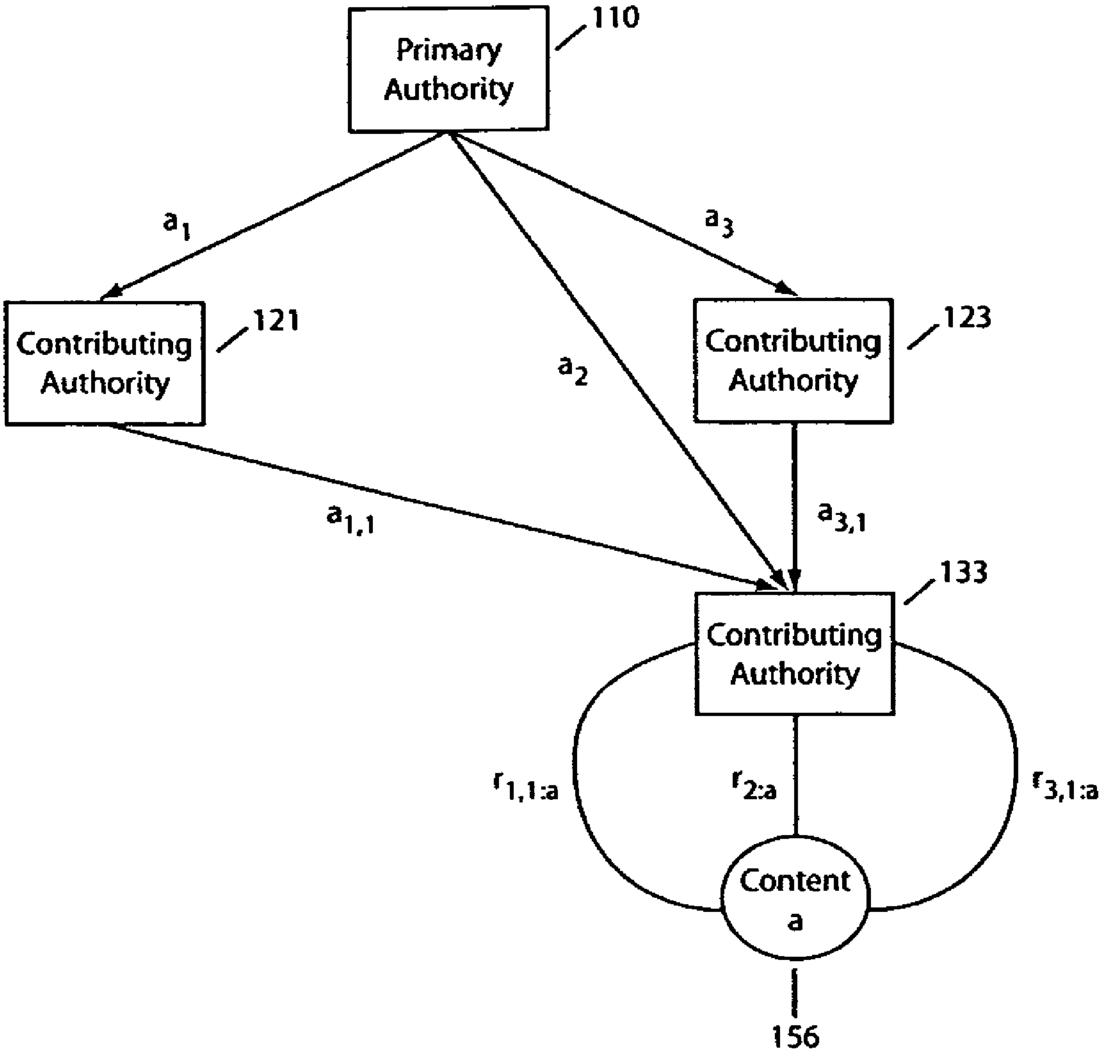
FIG. 3 shows an evaluation system according to a preferred embodiment of the invention in which a contributing authority is multiply designated.

FIG. 3 shows an evaluation system according to a preferred embodiment of the invention in which a contributing authority is multiply designated. In the particular case of FIG. 3, the contributing authority 133 has been designated both by the primary authority 110 and contributing authorities 121 and 123. Such a pattern of delegation is acceptable in the evaluation system, as both the restriction on further delegation of authority by the designated contributing authority 133 and the approaches to determining a composite rating are based upon the total authority delegated to the contributing authority. It is also possible to consider each designation as part of a separate chain of authority. For example, in FIG. 3, in rating the portion of content 156, the designated contributing authority 133 establishes three separate chains of authority. The value of the rating is the same for each chain of authority, that is, $r_{1,1:a}=r_{2:a}=r_{3,1:a}$. Notably, in the weighted average approach to computing the composite rating, acknowledging only a single chain of authority with a single total authority and acknowledging three separate chains of authority, each with a separate authority, are mathematically equivalent.

Figure 4:
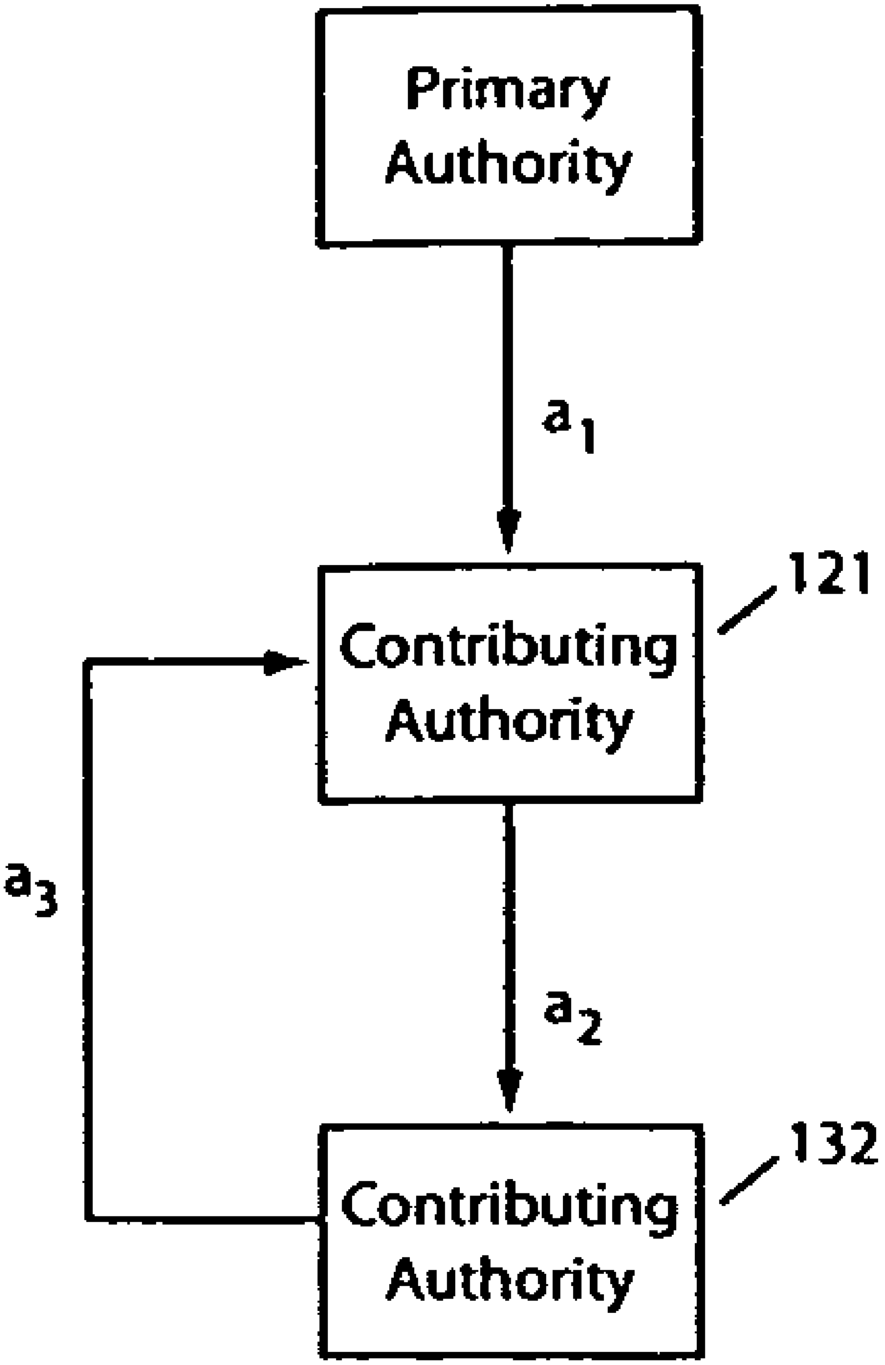
FIG. 4 shows an evaluation system in which a loop is created within a chain of authority.

FIG. 4 shows an evaluation system in which a loop is created within a chain of authority. A first contributing authority 121 has designated a second contributing authority 132, which has in turn has designated the first contributing authority. Due to the self-reinforcing nature of the loop, the quantity of authority delegated to the first and second authorities is ambiguous and potentially unbounded. Accordingly, in the preferred embodiment of the invention, the delegation process is restricted to prevent the formation of loops within a chain of authority.

A preferred restriction is based upon the concept of graph distance. By considering the evaluation system as a graph, each contributing authority may be characterized by a distance from the primary authority. The distance is defined as the number of delegations connecting the primary authority to the contributing authority along the chain of authority of shortest length. By restricting a contributing authority, characterized by a distance, from designating another contributing authority characterized by a lesser distance, loops within a chain of authority are prevented.

It is possible that with increasing distance from the primary authority, the reliability of the delegated authorities in evaluating content in a manner acceptable to the primary authority is decreased. To reflect this diminishing level of confidence with increasing distance, alternative embodiments of the invention may apply an attenuation factor to the quantity of authority that a contributing authority may delegate. Specifically, the total quantity of authority delegated by a contributing authority must not exceed the total quantity of authority it was itself delegated multiplied by an attenuation factor. The quantity of authority delegated to a contributing authority is thus attenuated with further removal from the source of the authority.

In another alternative embodiment of the invention, a primary authority or contributing authority may designate the primary authority of a separate reputation system. In this case, the primary authority is treated as a contributing authority. It is thus possible for one evaluation system to be a subset of a second evaluation system.

It should be noted that the evaluation systems of FIGS. 1-4, provided by way of example, are necessarily simple in nature. It is anticipated that an actual evaluation system would contain many more contributing authorities, some characterized by greater distances from the primary authority than shown in the figures. Furthermore, an actual evaluation system would contain many more portions of content, with each contributing authority typically evaluating many more portions of content than shown.

The ratings provided by the authorities within the evaluation system, and therefore the resulting composite rating, may apply to content of various types. For example, ratings may apply to content of different forms, e.g. actual content, such as scientific articles, tutorials, news stories, or editorials; or content referencing external items, such as products for sale or movies currently playing in theaters. The ratings may also be applied to content of various topics, such as science, biology, entertainment, and skiing.

Furthermore, there are several senses in which actual content and referenced items can be evaluated. For example, a rating may provide a measure of credibility, reflecting notions such as trustworthiness, accuracy, and impartiality. Alternatively, the rating may indicate an overall degree of excellence.

The particular notions encompassed by the ratings are not essential to the underlying methodology of the invention. It is thus anticipated that evaluation systems may be established to provide ratings encompassing these and other notions. In particular, it is anticipated that a particular primary authority may establish more than one evaluation system, each evaluating content of a different type or topic, or evaluating content in a different sense.

A primary authority may be a public entity, such as the American Medical Association, or a private entity, such as an individual with a trusted Web presence, a peer of the user, or the user himself. Preferably, the primary authority designates contributing authorities that it believes hold opinions consistent with its own opinions. Likewise, contributing authorities preferably designate additional contributing authorities with similar views. The delegation of authority thus ensures that although the primary authority may not directly evaluate a portion of content, the rating determined for the content is reflective of the opinion of the primary authority. Viewed externally, then, the composite rating obtained from the evaluation system represents the value of the content as if directly evaluated by the primary authority.

The rating returned by an evaluation system may be combined with ratings returned from other evaluation systems, to provide a single rating reflective of the combined opinions of several primary authorities. Such an approach is detailed in U.S. patent application Ser. No. 60/529,245 entitled Reputation System, filed Dec. 12, 2003. In this approach, the composite ratings returned by one or more evaluation systems are combined as specified by a personalized evaluation profile maintained by a user, and the user may freely add or remove evaluation systems from the evaluation profile as he sees fit. An evaluation system is therefore used or ignored by the community users at large, depending upon the efficacy of the evaluation system in providing ratings useful to the community of users. Accordingly, there is strong incentive for a primary authority to manage the evaluation systems judiciously. While the primary authority is preferably free to delegate as much authority to contributing authorities as it sees fit, it is important that the primary authority, and consequently the designated contributing authorities act prudently if the evaluation system is to find acceptance among the community of users.

It is anticipated that, to maintain the trust of the community of users, a primary authority may actively manage the evaluation system. For example, the primary authority may locate and designate and delegate authority to new contributing authorities. When a new contributing authority is added to the evaluation system, the relative authority of the previously designated authorities is diminished via a dilution effect. A primary authority may wish to offset this dilution by providing additional authority to one or more of the previously designated contributing authorities. Upon receiving additional authority from the primary authority, a contributing authority distributes the additional authority among the contributing authorities it has previously designated, or itself designates new contributing authorities.

Continued balancing of relative authority by issuance of additional authority may lead to an inflationary effect in which the value of each unit of authority is decreased. However, in the preferred approach to calculating the composite rating, the absolute values of the authority are not significant. Rather, the weighted average calculation considers only the relative authority of the authorities evaluating a portion of content. Continued balancing of authority by issuance of additional authority is thus an effective method of managing the evaluation system.

A primary authority may remove from the evaluation system or diminish the relative importance of a previously designated contributing authority by revoking all or a fraction of the previously delegated authority. The designated contributing authority must then revoke an equivalent quantity of authority from among the contributing authorities it has previously designated.

The above processes of adding authorities, removing authorities, and balancing relative authority levels may also be performed by the contributing authorities, subject to the aforementioned restriction that the total authority delegated by the contributing authority not exceed the quantity of authority it was itself delegated.

The ratings provided by the evaluating authorities are preferably stored as meta-data associated with the content. The invention may be practiced in conjunction with the World Wide Web, in which case the content may be located on widely distributed Web servers, and the ratings stored as meta-data markups of the content, e.g. HTML or XML tags. Alternatively, or in addition, the invention may be practiced in conjunction with a very large, distributed, annotated database such as the registry described in U.S. patent application Ser. No. 10/474,155, filed Oct. 21, 2003, entitled Knowledge Web. In this embodiment, the ratings may be stored as annotations associated with the content.

Concerns regarding falsification of ratings can be addressed using encrypted tokens, e.g. a system similar to the well known DigiCash system proposed by David Chaum (www.chaum.com). In those embodiments where authority can be retracted by the primary authority or contributing authorities, encrypted tokens with an expiration mechanism may be used.

Preferably, information identifying the rating authority is stored in conjunction with the rating. When a composite rating is to be determined for a portion of content, each authority that has evaluated the content is consulted to obtain a current level of authority for inclusion in the composite rating calculation. This consultation may not be necessary in some embodiments, though, in particular those embodiments employing the purely additive approaches to computing a composite rating. Alternatively, the authority associated with each rating may be stored as meta-data associated with the content. This approach, however, requires that a contributing authority actively update each of its ratings upon receiving additional (or losing previously granted) authority.

The storage of rating information in association with the content itself provides a notable advantage over systems that store evaluation information in a centralized server. As noted, determination of a composite rating may be performed with access to the content alone, which in turn may consult the authorities by which it was rated. However, access to a centralized server is not required to obtain a composite rating. The evaluation system is thus distributed in nature, obviating the need for a single, high capacity store of rating information capable of responding to evaluation requests from a large community of users.

The nature of the invention may be more clearly understood by considering the following example.

Figure 5:
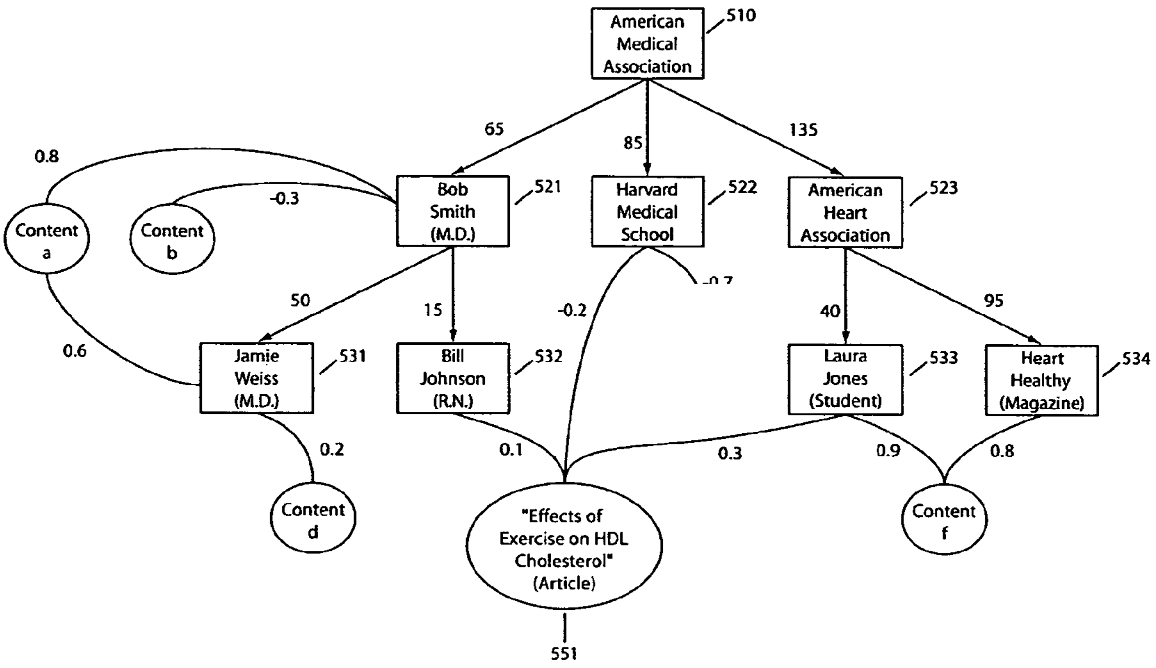
FIG. 5 shows an example evaluation system according to a preferred embodiment of the invention.

FIG. 5 shows an example evaluation system according to a preferred embodiment of the invention. Here, a patient recently diagnosed with high cholesterol has located a newspaper article entitled "Effects of Exercise on HDL Cholesterol," and would like an evaluation of the credibility of the article. The patient's personal evaluation profile indicates that for articles in the field of medicine, an evaluation system administered by the American Medical Association should be consulted.

In this evaluation system, the American Medical Association 510 has designated Bob Smith (M.D.) 521, the Harvard Medical School 522, and the American Heart Association 523 as contributing authorities by delegating 65, 85, and 135 units of authority to each, respectively. Bob Smith has in turn designated a colleague Jamie Weiss (M.D.) 531 and employee Bill Johnson (R.N.) 532 as contributing authorities, while the American Heart Association has designated a medical student, Laura Jones 533, and a magazine, Heart Healthy 534.

As can be seen in FIG. 5, the total quantity of authority delegated by each of the contributing authorities is equal to the authority that the contributing authority was itself delegated. For example, the American Heart Association has delegated 40+95=135 units of authority, the quantity of authority it was delegated by the American Medical Association.

Many of the contributing authorities have evaluated content. In particular, Bill Johnson, the Harvard Medical School, and Laura Jones have evaluated the article of interest to the patient, associating ratings of 0.1, −0.2 and 0.3 with the article, respectively. A composite rating for the article of interest may therefore be computed. Using the preferred weighted average approach, the composite rating is $$R=(15(0.1)+85(-0.2)+40(0.3))/(15+85+40)=-0.03, \qquad (6)$$

indicating that the article is of lesser credibility in the opinion of the American Medical Association. Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following claims.

The invention claimed is:

1. An apparatus for designating at least one authority to rate content, comprising:

at least one server in a distributed network that receives a rating of content or a designation of content rating authority from a primary authority, said primary authority designating at least a portion of said content rating authority to a first level of a plurality of contributing authorities, said portion individually designated for each contributing authority;

said at least one server in said distributed network that receives a rating of content or a designation of content rating authority from said first level of said plurality of contributing authorities, said first level of said plurality of contributing authorities receiving said portion of content rating authority from said primary authority and being capable of designating at least a portion of content rating authority to a second level of at least one contributing authority;

said at least one server in said distributed network that receives a rating from said second level of at least one contributing authority, said second level of at least one contributing authority receiving said portion of content rating authority from said first level of contributing authority;

said at least one server in said distributed network that prevents a contributing authority in said second level from designating content rating authority to a contributing authority in said first level to avoid creating a loop of designated authorities;

a plurality of ratings, each rating associated with said content by any of:

said primary authority, said first level of plurality of contributing authorities; and said second level of at least one contributing authority;

a computer that computes a composite rating for said content as a function of said plurality of ratings and said content rating authority of each provider of said ratings, wherein said composite rating is determined by combining said ratings, wherein a level of influence is conferred upon each of said contributing authorities in accord with each of said contributing authorities' respective delegated quantity of authority, wherein said composite rating, R, is calculated according to:

$$R=(1/w)\Sigma_1^N(w_i r_i)$$

wherein $W_i$ is authority delegated to authority of i, wherein $r_i$ is rating i of N ratings, and wherein W is the sum of the N weights; and said at least one server in said distributed network comprising a database for storing said content in association with said plurality of ratings and said composite rating.

2. The apparatus of claim 1, wherein said composite rating comprises a count of said ratings.

3. The apparatus of claim 1, wherein each of said portion of said content rating is specified numerically.

4. The apparatus of claim 3, further comprising a distance, wherein said distance measures the number of delegations connecting said primary authority to a final contributing authority, wherein said composite rating incorporates an attenuation factor associated with said distance of a rating of said final contributing authority.

5. The apparatus of claim 1, wherein each of said ratings is specified numerically.

6. The evaluation system of claim 5, wherein at least one of said ratings comprises a negative number indicating distrust of said at least one of said ratings.

7. The apparatus of claim 5, wherein each of said ratings is a number between 0 and 1, inclusively.

8. The apparatus of claim 5, wherein determining said composite rating comprises an additive combination of said ratings.

9. The apparatus of claim 5, wherein determining said composite rating comprises a computation of any of:

a mean;

a mode; and a median of said ratings.

10. The apparatus of claim 5, wherein said composite rating comprises a weighted average of said ratings, wherein each of said ratings is weighted in proportion to a respective delegated portion of authority held by said contributing authority.

11. The apparatus of claim 1, wherein each of said ratings indicates any of:

reliability;

trustworthiness;

accuracy;

impartiality; and quality.

12. The apparatus of claim 1, said primary authority further comprising:

means for limiting evaluation of said content to content of a particular form.

13. The apparatus of claim 1, said primary authority further comprising:

means for limiting evaluation of said content to content comprising a scientific article.

14. The apparatus of claim 1, further comprising:

means for said primary authority to add a new first level contributing authority by delegating authority to said new first level contributing authority.

15. The apparatus of claim 1, said further comprising:

means for said primary authority to remove a first level contributing authority by withdrawing authority previously delegated to said first level contributing authority.

16. The apparatus of claim 1, further comprising:

means for said primary authority to adjust relative authority of any of said first level contributing authorities by any of:

delegating additional authority to at least one of said first level contributing authorities; and withdrawing authority from at least one of said first level contributing authorities.

17. The apparatus of claim 1, further comprising:

means for any of said first level contributing authorities to add a new second level contributing authority by delegating authority to said new second level contributing authority.

18. The apparatus of claim 1, further comprising:

means for any of said first level contributing authorities to remove a second level contributing authority by withdrawing authority previously delegated to said second level contributing authority.

19. The apparatus of claim 1, further comprising:

means for any of said first level contributing authorities to adjust relative authority of said second level contributing authorities by any of:

delegating additional authority to at least one of said second level contributing authorities; and withdrawing authority from at least one of said second level contributing authorities.

20. The apparatus of claim 1, wherein a sum of authority delegated by a first level contributing authority can not exceed a respective quantity of authority delegated to said second level contributing authority.

21. The apparatus of claim 1, wherein a sum of authority delegated by a first level contributing authority cannot exceed a respective quantity of authority delegated to said second level contributing authority, reduced by an attenuation factor.

22. The apparatus of claim 1, further comprising:

means for referencing said composite rating by a personalized evaluation profile to provide a user an indication of value of said content to the user, wherein said composite rating reflects evaluations systems selected by the user in said personalized evaluation profile of the user.

23. The apparatus of claim 22, wherein said apparatus comprises an evaluation system, further comprising:

means for combining said composite rating with at least one other composite rating from at least one other evaluation system according to said personalized evaluation profile.

24. A computer implemented method for evaluating content, comprising the steps of:

receiving, with at least one server in a distributed network, a rating of content or a designation of content rating authority from a primary authority;

delegating, with said at least one server, at least a portion of said content rating authority to a first level of a plurality of contributing authorities from said primary authority, said portion individually designated for each contributing authority;

designating, with at least one of said first level of plurality of contributing authorities, at least a portion of said content rating authority to a second level of at least one contributing authority;

preventing, with said at least one server, a contributing authority in said second level from designating content rating authority to a contributing authority in said first level to avoid creating a loop of designated authorities;

associating, with said at least one server, a plurality of ratings with said content, each rating associated by any of:

said first primary authority, said first level of contributing authorities;

said second level of at least one contributing authority; and computing, with a computer, a composite rating for said content as a function of said plurality of ratings and said portion of content rating authority for each provider of said ratings, wherein said composite rating is determined by combining said ratings, wherein a level of influence is conferred upon each of said contributing authorities in accord with each of said contributing authorities' respective delegated quantity of authority, wherein said composite rating, R, is calculated according to:

$$R=(1/w)\Sigma_1^N(w_i r_i)$$

wherein $W_i$ is authority delegated to authority of i, wherein $r_i$ is rating i of N ratings, and wherein W is the sum of the N weights; and storing, on said at least one server in said distributed network comprising a database, said content in association with said plurality of ratings and said composite rating.

25. The method of claim 24, wherein said computing step comprises combining said ratings, wherein a level of influence is conferred upon each of said contributing authorities in accordance with each of said contributing authorities' respective portion of content rating authority.

26. The method of claim 24, wherein each of said one or more portion of content rating authority is specified numerically.

27. The method of claim 24, wherein each of said ratings is specified numerically.

28. The method of claim 27, wherein said computing step comprises a computation of any of:

a mean;

a mode; and a median of said ratings.

29. The method of claim 27, wherein said computing step comprises a calculation of a weighted average of said ratings, wherein each of said ratings is weighted in proportion to a portion of content rating authority held by said contributing authority.

30. The method of claim 23, wherein each of said ratings indicates any of:

reliability;

trustworthiness;

accuracy;

impartiality; and quality.

31. The method of claim 24, wherein a sum of authority delegated by at least one of said first level of said plurality of contributing authorities cannot exceed a portion of content rating authority delegated to said second level of at least one contributing authority.

32. The method of claim 24 further comprising the step of:

preventing each of said first level of plurality of contributing authorities from designating content rating authority to another of said first level of contributing authorities to thereby avoid creating a loop of designated authorities.

* * * * *